(12) United States Patent
Mcgehee et al.

(10) Patent No.: US 9,095,095 B2
(45) Date of Patent: Aug. 4, 2015

(54) CLIP ON REEL TINE

(71) Applicant: AGCO Corporation, Duluth, GA (US)

(72) Inventors: Greg S. Mcgehee, Hesston, KS (US); Dustin Jost, Newton, KS (US); Shane Bollinger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 179 days.

(21) Appl. No.: 13/832,142

(22) Filed: Mar. 15, 2013

(65) Prior Publication Data
US 2014/0260171 A1 Sep. 18, 2014

(51) Int. Cl.
*A01D 80/02* (2006.01)

(52) U.S. Cl.
CPC ...................... *A01D 80/02* (2013.01)

(58) Field of Classification Search
USPC .............. 56/14.3, 14.4, 16.1, 16.2, 17.3, 220, 56/364, 400, 400.21, DIG. 20
See application file for complete search history.

(56) References Cited

U.S. PATENT DOCUMENTS

| | | | | |
|---|---|---|---|---|
| 4,128,918 A | * | 12/1978 | Wenk | 24/16 R |
| 4,601,450 A | * | 7/1986 | Lindquist | 248/71 |
| 5,048,462 A | * | 9/1991 | Hostetler | 119/72 |
| 5,474,268 A | * | 12/1995 | Yu | 248/61 |
| 5,782,090 A | * | 7/1998 | Locke | 60/397 |
| 6,324,823 B1 | * | 12/2001 | Remillard | 56/220 |
| 6,910,323 B2 | * | 6/2005 | Bickel | 56/220 |
| 7,856,801 B2 | * | 12/2010 | Remillard | 56/220 |

* cited by examiner

*Primary Examiner* — Thomas B Will
*Assistant Examiner* — Mai Nguyen

(57) ABSTRACT

A plastic tine for mounting on a support tube of a harvester reel has a generally C-shaped mounting base that snaps onto the backside of the tube and an elongated finger that projects outwardly and normally downwardly from the mounting base. A generally C-shaped clip, oriented reversely to the mounting base, partially surrounds the front side of the support tube and is connected to one leg of the mounting base in such a manner that a free end of the clip can be swung toward and away from a corresponding opposite leg of the mounting base. Interlocking structure on the free end of the clip and corresponding distal end of the mounting base retains the clip in place against the front side of the support tube when the clip is fully installed. A special guard protectively overlies the free end of the mounting clip when it is locked to the mounting base so as to prevent accidental dislodgment by crop materials and residue during field operations. Provision is made for attachment of the tine to the tube by a threaded fastener in case the clip is dislodged or unavailable in the field. Alternative embodiments include an integral one-piece construction wherein the clip is integral with the rest of the tine and a separate two-part construction wherein the clip is a separate piece attachable to the rest of the tine.

13 Claims, 7 Drawing Sheets

1

CLIP ON REEL TINE

TECHNICAL FIELD

The present invention relates to the field of harvesting machines and, more particularly, to the tines employed on the crop gathering reels of such machines.

BACKGROUND AND SUMMARY

The crop gathering reels of harvesting machines are typically provided with pointed tines that engage and rake standing crop material rearwardly into the sickle or other cut off mechanism of the machine as the reel rotates and the machine advances through the field. Such tines are usually attached to transverse support members that extend along the length of the reel and oscillate about their longitudinal axes during reel rotation to place the tines in their optimum angle or attitudes as they sweep through the crop.

It is known in the art to make such tines entirely, or almost entirely, out of synthetic resinous material. However, in many instances, such plastic tines are still attached to their support members using metal fasteners such as screws. Fastening tines to the reel using screws can take considerable time and effort. Moreover, it may be difficult to find an appropriate standard size screw due to the substantial length and relatively small diameter required for the screw. Another problem is under or over tightening the screw during installation. And there is always the possibility of breaking the tine during the installation efforts.

The present invention provides a tine of at least predominantly synthetic resinous material that can be quickly and easily installed on or removed from the reel without the use of auxiliary threaded fasteners such as screws or the like. In one form of the invention the tine has a generally C-shaped mounting base that receives and embraces the backside of the reel support member, while a generally C-shaped, oppositely oriented clip receives and embraces the front side of the support member. One end of the clip is attached to the base of the tine in such a manner that the clip can swing or flex toward and away from the base, while the opposite end of the clip is provided with suitable locking structure that releasably engages and interlocks with corresponding structure on the mounting base. A guard on the mounting base overlies and protects the locking end of the clip when the clip is securely locked so as to prevent accidental unlocking of the clip during field operations as crop materials and other residue might otherwise tend to force the clip open.

The clip is preferably hingedly secured to the mounting base through either an integral connection with the base or other suitable hinge structure, in which latter case the clip would be a separate component from the tine body itself. In both types of connections, the mounting base is designed in such a manner that, in the event the clip is detached from the tine or otherwise unavailable, the tine may be temporarily secured to the support member using a threaded fastener.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. Directional references such as "left" and "right" in this specification are given as if the machine were being viewed from the rear looking forwardly.

Figure 1:
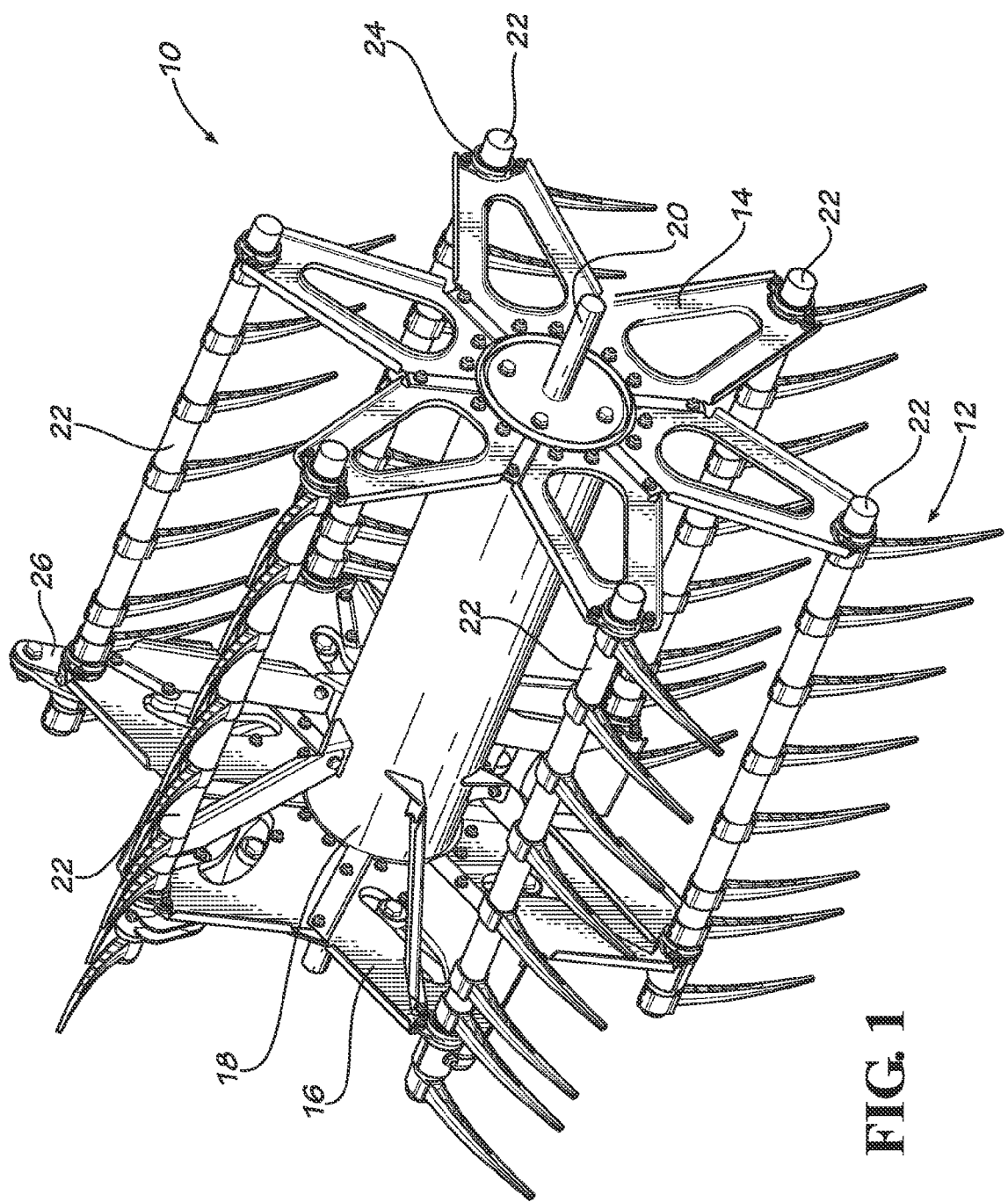
FIG. 1 is a left, front isometric view of a harvester reel utilizing a clip-on tine in accordance with the principles of the present invention.
Figure 3:
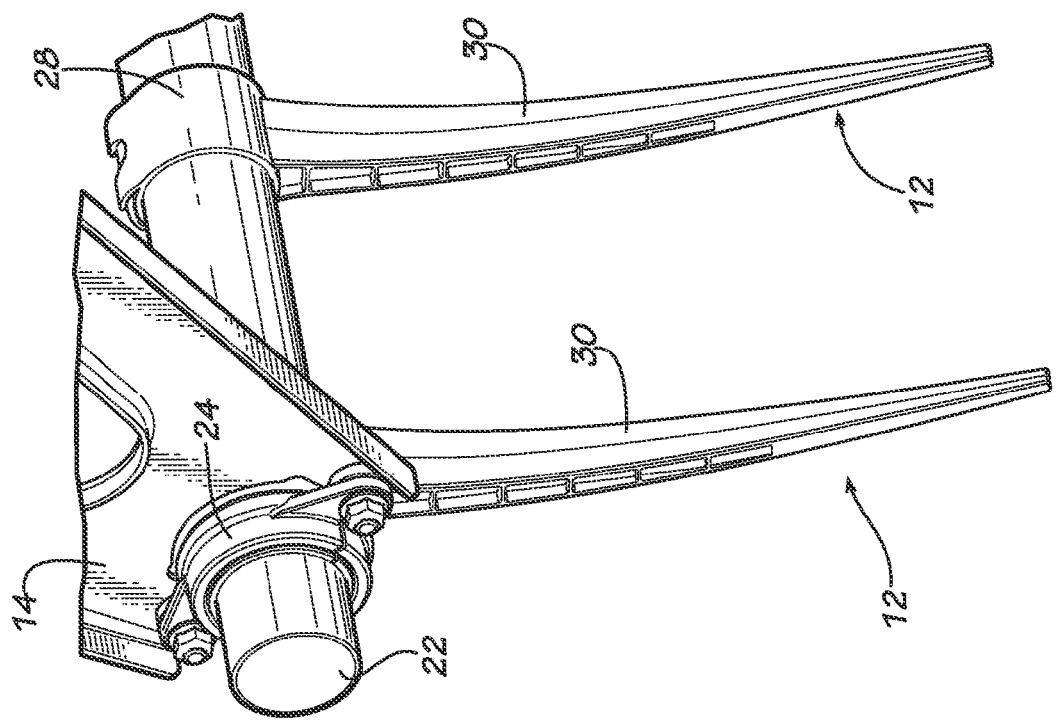
FIG. 3 is an enlarged, fragmentary, left, rear isometric view of the lower left corner of the reel showing the same two tines from a different perspective.
Figure 2:
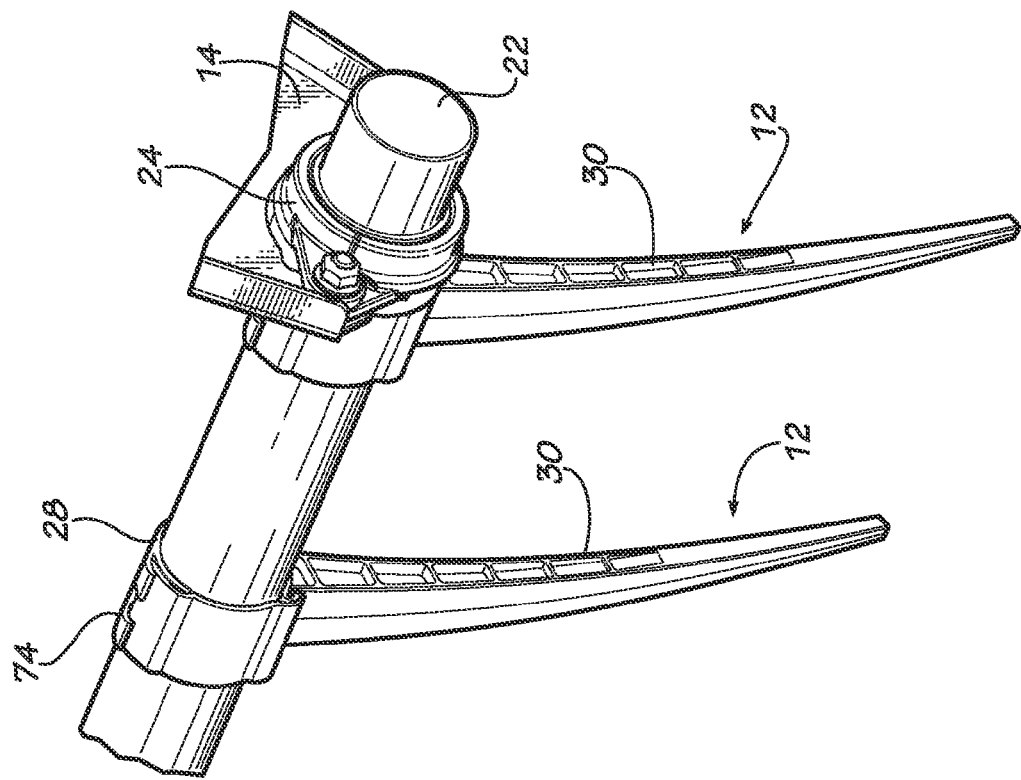
FIG. 2 is an enlarged, fragmentary, left, front isometric view of the lower left corner of the reel showing a pair of the tines.
Figure 4:
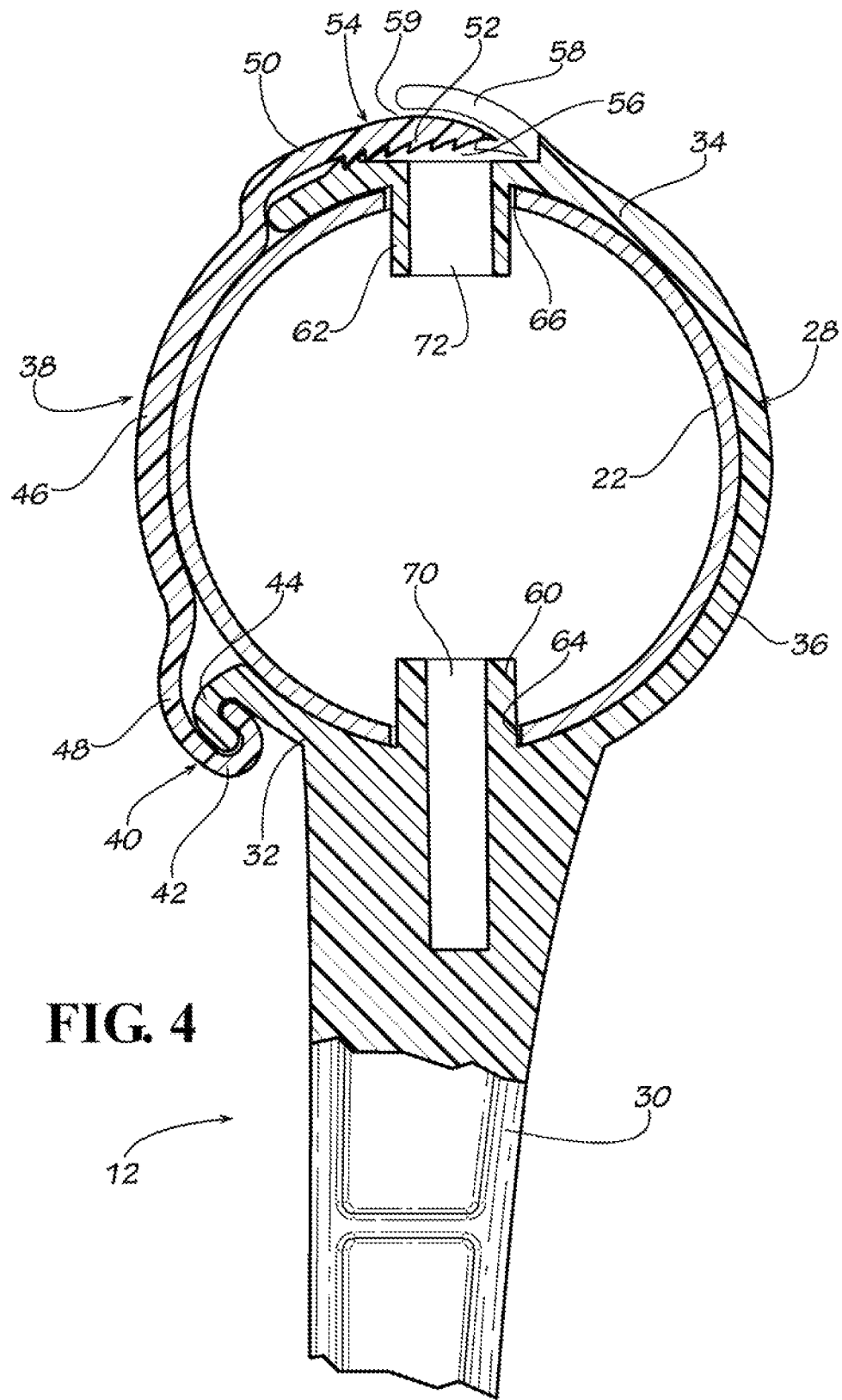
FIG. 4 is a further enlarged, fragmentary, vertical cross-sectional view of one of the tines and its mounting support tube.
Figure 6:
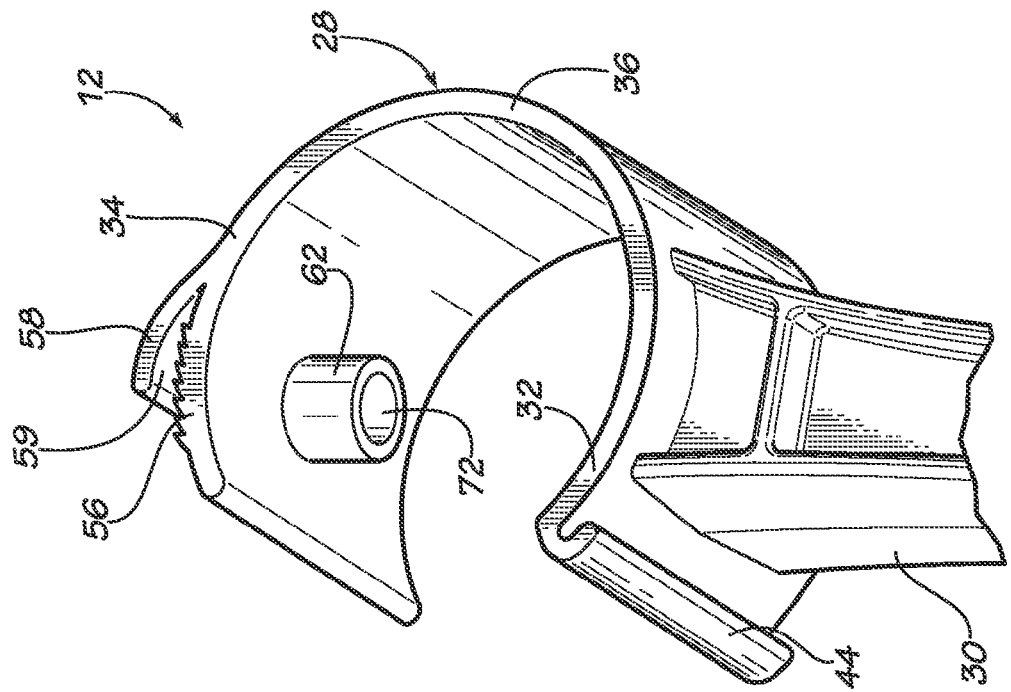
FIG. 6 is an enlarged, fragmentary, left, front, bottom isometric view of the tine of FIG. 5.
Figure 5:
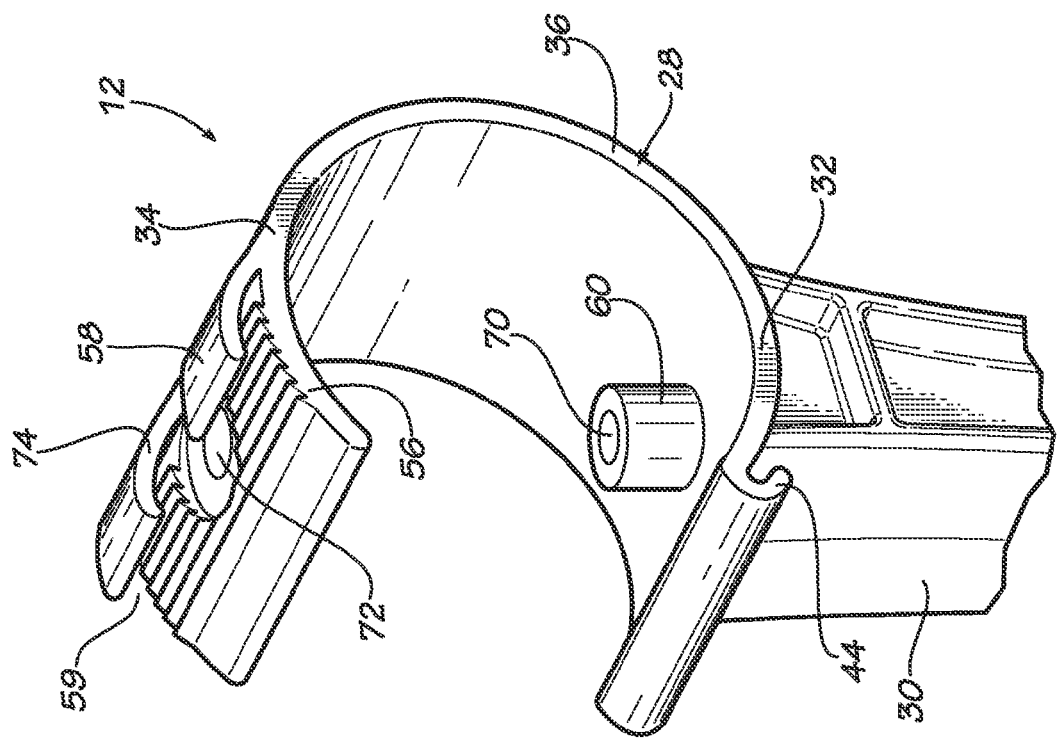
FIG. 5 is an enlarged, fragmentary, left, front, top isometric view of one of the tines without the separate retaining clip.
Figure 8:
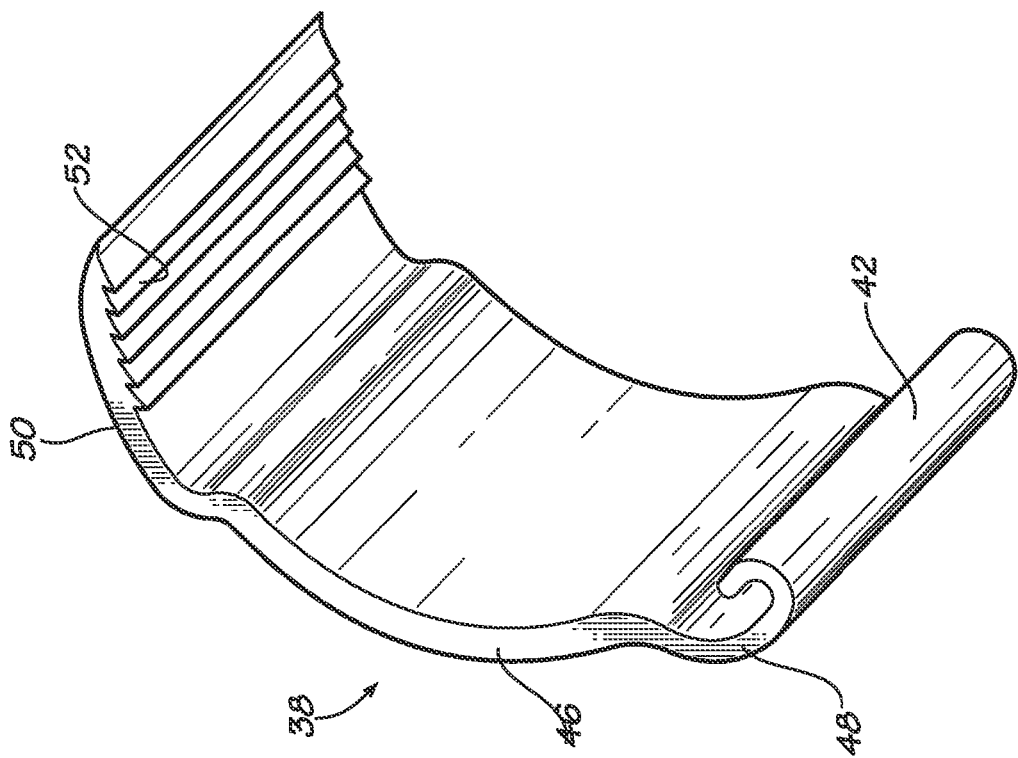
FIG. 8 is a left, rear isometric view of the clip showing the interior side of the clip.
Figure 7:
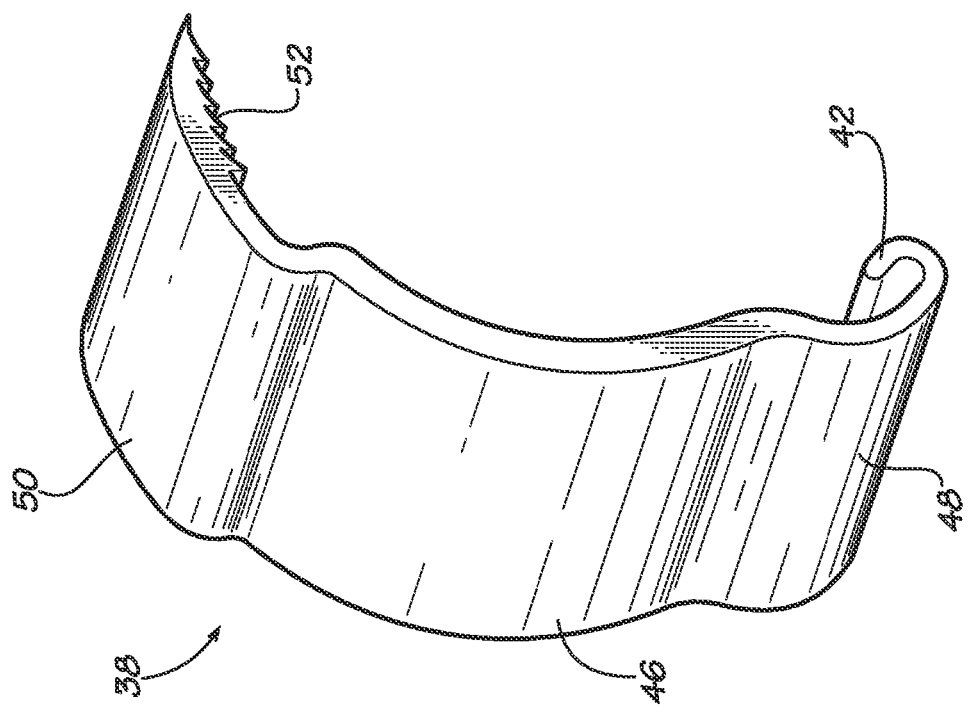
FIG. 7 is a left, front isometric view of the separate retaining clip of the tine showing the exterior side of the clip.

FIG. 1 shows a harvesting reel 10 of typical construction, with the exception of the tines 12 that are constructed in accordance with the principles of the present invention. Reel 10 has a pair of large, star-shaped and longitudinally spaced apart plates 14 and 16 at opposite ends of the reel, as well as a center, cylindrical tube 18 that interconnects plates 14 and 16 in concentric relationship therewith. Plates 14, 16 are secured to central tube 18 for rotation therewith in a counter-clockwise direction viewing FIG. 1, while central tube 18 is fixedly secured to a shaft 20 through which driving power is inputted to reel 10 by means not shown.

Reel 10 also includes a plurality of tine support members in the form of tubes 22 that are rotatably supported at their opposite ends by suitable bearings 24 in the plates 14, 16. Bearings 24 permit the tubes 22 two be oscillated about their respective longitudinal axes in a controlled manner during rotation of reel 10 so that tines 12 are caused to plunge down into the crop material at the lower forward portion of their path of travel, sweep rearwardly in the nature of rakes as they move through the lower stretch of their path of travel, and withdraw essentially vertically from the crop materials as they move through the lower and upper rear stretches of their path of travel. Each of the tubes 22 is provided with a crank 26 at the end thereof which is adjacent plate 16, such crank 26 being operated by suitable cam mechanism (not shown) to carry out the oscillating action of the support tubes 22.

In accordance with the principles of the present invention, each of the tines 12 includes a generally C-shaped mounting base 28 that is adapted to receive and embrace the backside of the mounting tube 22 on which the tine is mounted. An elongated, slightly curved and pointed finger 30 is integrally secured to base 28 and projects outwardly therefrom. When tine 12 is attached to its support tube 22, the slightly concave, curved face of the finger 30 faces rearwardly generally in the direction of crop flow so that finger 30 has an aggressive action as it engages and rakes through the crop materials. Finger 30 is laterally centered with respect to the mounting base 28, although it is disposed generally adjacent one end of base 28. It is to be understood that support tube 22 may not be perfectly circular in transverse configuration. Thus, although mounting base 28 is described as being generally C-shaped, such characterization is to be liberally construed to encompass shapes other than exact C's. In fact, the term "C-shaped" when used throughout this specification and claims is to be liberally construed in all instances.

Mounting base 28 has a pair of arcuate arms 32 and 34 that are integrally interconnected by a bight 36. A generally C-shaped retaining clip 38 around the front side of support tube 22 interconnects the distal ends of arms 32, 34 to retain tine 12 on tube 22. In one embodiment of the invention, clip 38 comprises a separate part from mounting base 28 and is connected to the distal end of arm 32 in such a manner that clip 38 can swing toward and away from the distal end of arm 34 during installation and removal of tine 12 from support tube 22. In the embodiment illustrated in FIGS. 1-9, such swingable movement is provided by a hinge assembly 40 comprising a pair of releasably interengaging hooks 42 and 44 on the clip 38 and distal end of arm 32 respectively. Hinge assembly 40 may take a variety of forms without departing from the principles of the present invention.

The clip 38 has a central arcuate section 46 of constant radius, and a pair of opposite end sections 48 and 50 that are joggled slightly outwardly from central section 46 and have axes of curvature that are different from central section 46. Hook 42 of hinge assembly 40 is formed in end section 48, while one part 52 of a locking assembly 54 is formed in the other end section 50. Locking assembly 54, which also comprises a part 56 on the distal end of arm 34, serves to releasably lock or latch the end 52 to the distal end of arm 34. Preferably, but not necessarily, the parts 50, 52 of locking assembly 54 comprise interlocking teeth that are configured in such a manner that retrograde movement of clip end 50 is prevented once the teeth are interlocked. On the other hand, the teeth do not prevent movement of clip end 50 in a direction that would further tighten clip 38 on tube 22 when the teeth are interlocked.

Due to the offset or joggled nature of clip end 50, clip end 50 overlaps the distal end of arm 34 when end 50 of clip 38 is locked to base 28. In order to prevent clip 38 from becoming accidentally unlocked from mounting base 28 at lock assembly 58 during field operations, base 28 is provided with a protective guard 58 that overlies and covers end section 50 of clip 38 when end section 50 is locked to the distal end of arm 34. Guard 58 is in the nature of a cover flap having an inner end that is integrally connected to arm 34 and an outer end that is spaced above teeth 56 on arm 34. Such spacing of guard 58 relative to teeth 56 presents a recess or pocket 59 beneath guard 58 within which the end 52 of clip 38 may reside when it is locked to base 28.

Preferably, mounting base 28 and finger 30 are both constructed from a suitable synthetic resinous material such as polyurethane and are molded as one piece. Preferably also, clip 38 is constructed from the same synthetic resinous material as mounting body 28 and finger 30, although this is not essential. Clip 38 could be constructed from any number of suitable materials, including a metallic material, for example. It is desirable in any event, that the arms 32, 34 of mounting base 28 be somewhat resilient so that they can be spread apart during installation on and removal from support tube 22 and will tend to grip support tube 22 when installed thereon.

Likewise, clip 38 should be somewhat resilient so that its opposite end sections 48 and 50 can be yieldably spread apart during installation on and removal from mounting base 28. The dimensions and inherent resiliency of clip 38 should be such that clip 38 tends to squeeze against the opposite distal ends of mounting base arms 32, 34 and support tube 22 when clip 38 is fully installed.

In order to keep tine 12 properly located on support tube 22, tine 12 is provided with a pair of diametrically opposed bosses 60 and 62 that are adapted to be securely received within a pair of corresponding openings 64 and 66 (FIG. 4) in support tube 22. Bosses 60, 62 are laterally centered within the mounting base 28 and are disposed on the interior periphery thereof, pointing at one another. Each of the bosses 60, 62 is cylindrical in configuration and projects radially inwardly toward the center of mounting base 28 for a distance that exceeds the thickness of the wall of support tube 22 so that bosses 60, 62 resist accidental dislodgement from openings 64 and 66.

Figure 9:
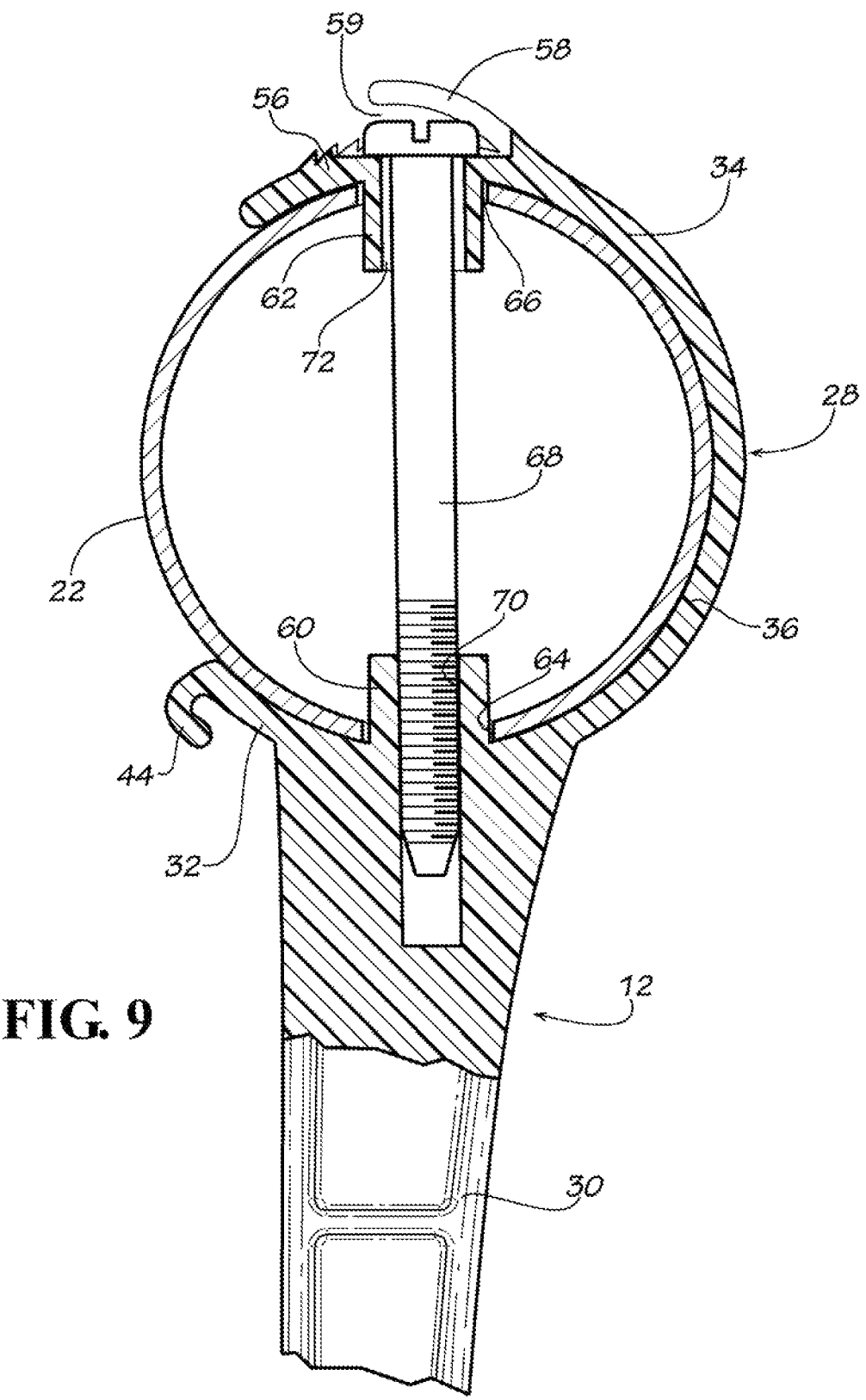
FIG. 9 is an enlarged, fragmentary, vertical cross-sectional view similar to FIG. 4 but illustrating how the tine can be secured to the support tube using a threaded fastener in the event the retaining clip is either lost or otherwise unavailable.

There may be instances in which a retaining clip 38 is not available for tine 12 such as, for example, if a clip 38 fails in the field and becomes separated from the rest of the tine 12. The clip-less tine may still be secured to the support tube 22 in a temporary manner by using a suitable threaded fastener such as screw 68 (FIG. 9). In this regard, arms 32 and 34 of mounting base 28 are provided with corresponding through holes 70 and 72 respectively that are adapted to receive and clear the threaded shank portion of screw 68. Holes 70, 72 are preferably located within bosses 60, 62 and are axially aligned with finger 30 so that screw 68 may thread itself down into the body of finger 30 immediately below boss 60 when screw 68 is installed. Guard 58 has a clearance aperture in the form of a notch 74 (FIGS. 2, 5) that is aligned with hole 72 so as to permit access to hole 72 by screw 68 when such access is required.

In use, tine 12 is installed on support tube 22 in a simple and quick two-step process. First, without the clip 38, tine 12 is positioned alongside the support tube 22 with the open mouth created by the distal ends of arms 32, 34 next to support tube 22 and bosses 60, 62 aligned with their corresponding openings 64, 66 in support tube 22. Then, mounting base 28 is simply pushed onto support tube 22, spreading arms 32, 34 to the extent necessary to accommodate support tube 22, which has an outer diameter exceeding the width of the mouth between arms 32, 34. As bosses 60, 62 snap into their locating openings 64, 66, the spread apart arms 32, 34 return to their nominal positions and embrace the backside of support tube 22. Preferably, arms 32, 34 and bight 36 of mounting base 28 extend for greater than 180° but slightly less than 270° so as to wrap themselves around support tube 22 accordingly.

Once the tine body consisting of the mounting base 28 and finger 30 has been snapped onto the backside of support tube 22, retaining clip 38 is installed on the front side. After aligning the opposite ends of clip 38 with the distal ends of mounting base arms 32, 34, clip 38 is pushed onto the front side of mounting tube 22 with hook 42 bearing against hook 44 and teeth 52 bearing against teeth 56. As clip 38 is continued to be pushed into place, opposite ends 48 and 50 thereof spread apart to the extent necessary to accommodate the greater dimension of base 28 across the hook 44 and teeth 56 of mounting base 28. Once clip 38 has been pushed far enough onto the tube 22 that hook 42 snaps over and engages with hook 44, the opposite end 50 of clip 38 can be pushed up into recess 59 until teeth 52 and 56 become securely interlocked. Once teeth 52, 56 are interlocked, retrograde withdrawal of clip 38 from recess 60 is prevented. And guard 58 prevents crop and residue from getting under the free end of the clip and dislodging the same from teeth 56.

It is also possible to install clip 38 by first engaging hook 42 with hook 44 and then swinging clip 38 about the hinge created by hooks 42, 44 until the opposite end 50 of clip 38 is inserted up into recess 59. With the hooks 42 and 44 fully engaged, the opposite end 50 of clip 38 can simply be slid along teeth 56 and into recess 59 until clip 38 is tightly secured against the front side of the support tube 22.

In the event clip 38 becomes separated from the rest of tine 12 for any reason, or is simply unavailable when the tine needs to be installed, a threaded fastener such as the screw 68 may simply be installed through holes 70, 72, bosses 60, 62, and openings 64, 66 and threaded down into the body of tine finger 30 as a temporary means of securely attaching tine 12 to tube 22. Later, when a clip 38 becomes available, screw 68 may be removed if desired and replaced by the clip.

Alternative Embodiment

Figure 10:
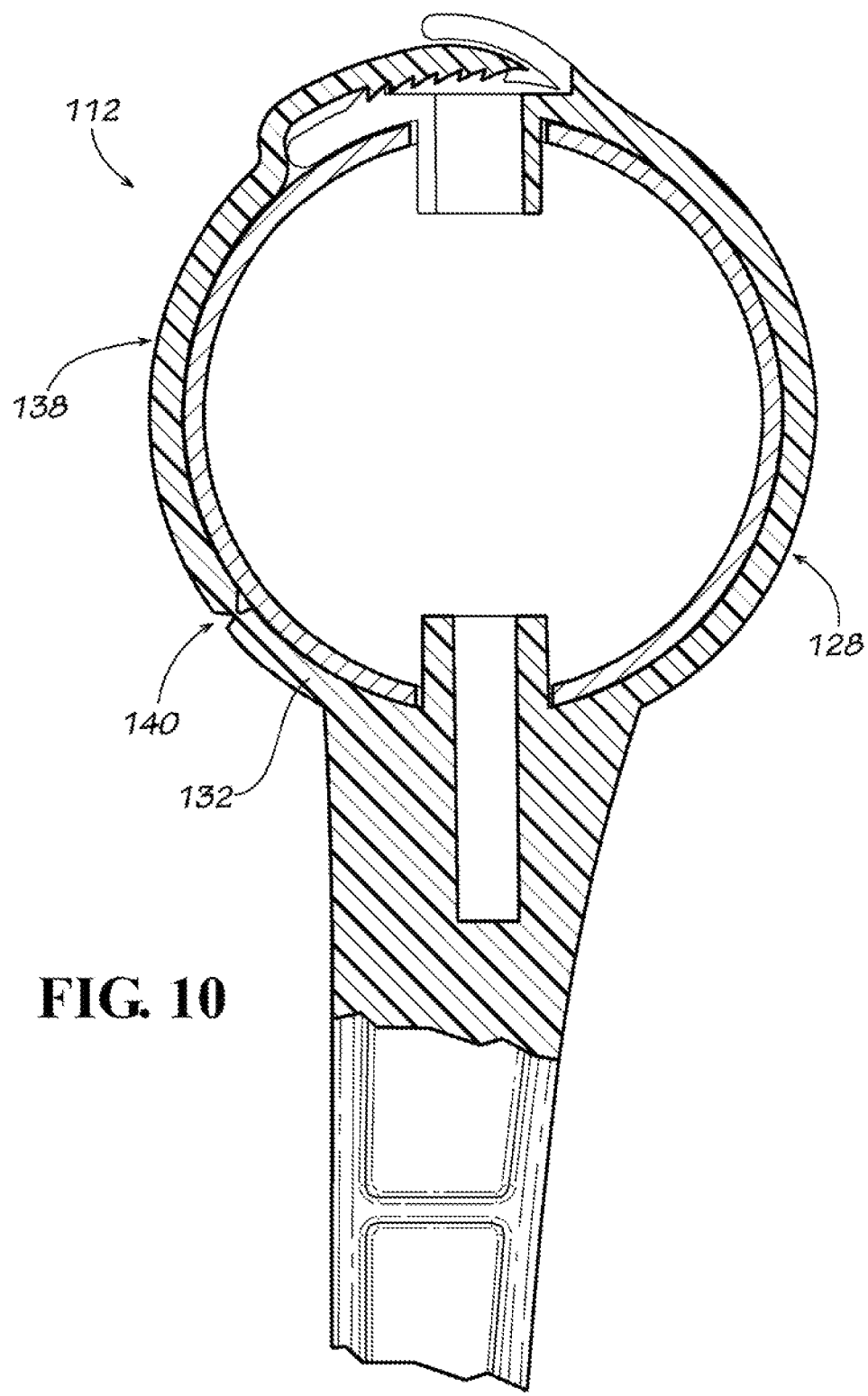
FIG. 10 is an enlarged, fragmentary vertical cross-sectional view of a second embodiment of clip-on tine in accordance with the present invention.

FIG. 10 shows an alternative embodiment wherein the retaining clip is integral with the rest of the tine rather than comprising a separate piece as in the first embodiment. Thus, tine 112 is identical to tine 12, except in the manner that the clip of tine 112 is hingedly attached to the rest of the time. In this regard, clip 138 of tine 112 is integrally connected to arm 132 of mounting base 128 by a living hinge 140 in the nature of a line of weakness presented by a region of reduced thickness of material. Thus, clip 138 can hinge about living hinge 140 to the extent necessary during installation on and removal of tine 112 from support tube 22. Preferably, the entirety of tine 112 is constricted from a suitable synthetic resinous material such as polyurethane.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A tine adapted for attachment to a support member on a harvesting reel, said tine comprising:
   a generally C-shaped mounting base adapted to receive and embrace the support member when the tine is mounted on the support member, said base having a pair of opposed arms provided with distal ends;
   a crop-engaging finger secured to said base and projecting outwardly therefrom; and
   a retaining clip spanning said distal ends of the arms, one end of said clip being connected to the distal end of one of said arms in such a manner that the clip can be swung toward and away from the distal end of the other of said arms, said other end of said clip overlapping and being releasably lockable with the distal end of the other of said arms, said other arm having an anti-unlocking guard disposed for protectively overlying said other end of the clip when said other end of the clip overlaps and is locked to the distal end of said other arm, said clip being detachable from said base, said base having a pair of diametrically opposed holes for receiving a fastener for securing the tine to said support member without said clip, said holes being in said arms, said guard comprising a cover flap having a clearance aperture aligned with said holes to avoid interference with a fastener when a fastener is used to secure the tine to the support member.

2. A tine as claimed in claim 1, said other end of the clip and the distal end of said other arm having anti-retrograde, interlockable teeth for preventing retrograde movement of the clip when the clip is locked to said distal end of said other arm.

3. A tine as claimed in claim 1, said guard having an inner end joined to said other arm and an outer end spaced above said distal end of said other arm to define a recess beneath the guard within which said other end of the clip may reside when said other end of the clip is locked to the distal end of said other arm.

4. A tine as claimed in claim 1, said arms having a pair of internal, diametrically opposed bosses adapted to fit into a pair of corresponding openings in said support member, said holes passing through said bosses.

5. A tine as claimed in claim 4, one of said bosses being aligned with said finger for guiding a fastener into the finger when the tine is secured to the support member by a fastener.

6. A tine as claimed in claim 1, said one end of the clip and said distal end of said one arm being releasably interconnected.

7. A tine as claimed in claim 6, said one end of the clip and said distal end of said one arm having a pair of mutually interlocking hooks for hingedly and releasably connecting said one end of the clip with said distal end of said one arm.

8. A tine as claimed in claim 1, said one end of the clip being integrally connected with said one arm of the mounting base.

9. A tine as claimed in claim 8, said integral connection of the clip with said mounting base comprising a line of weakness that permits the clip to hinge relative to the mounting base.

10. A tine as claimed in claim 1, said clip being resiliently spreadable to a position in which said opposite ends of the clip overlap corresponding opposite distal ends of said arms.

11. A tine as claimed in claim 1, said clip being constructed from a different material than the base and the finger.

12. A tine as claimed in claim 11, said base and finger being constructed from a synthetic resinous material, said clip being constructed from a metallic material.

13. A tine as claimed in claim 1, said clip, said base and said finger being constructed from a synthetic resinous material.

\* \* \* \* \*